(12) United States Patent
Soo

(10) Patent No.: US 12,463,741 B2
(45) Date of Patent: Nov. 4, 2025

(54) NETWORK SYSTEMS AND METHODS FOR WORD BASED ARBITRATION OF DATA

(71) Applicant: Intel Corporation, Santa Clara, CA (US)

(72) Inventor: Choon Yip Soo, Bayan Lepas (MY)

(73) Assignee: Altera Corporation, San Jose, CA (US)

( * ) Notice: Subject to any disclaimer, the term of this patent is extended or adjusted under 35 U.S.C. 154(b) by 838 days.

(21) Appl. No.: 17/531,356

(22) Filed: Nov. 19, 2021

(65) Prior Publication Data
US 2022/0077953 A1    Mar. 10, 2022

(51) Int. Cl.
*H04L 12/26* (2006.01)
*H04L 1/00* (2006.01)
*H04L 49/351* (2022.01)

(52) U.S. Cl.
CPC .......... *H04L 1/0002* (2013.01); *H04L 1/0071* (2013.01); *H04L 49/351* (2013.01)

(58) Field of Classification Search
None
See application file for complete search history.

(56) References Cited

U.S. PATENT DOCUMENTS

| | | | | |
|---|---|---|---|---|
| 5,982,700 A * | 11/1999 | Proebsting | ............... | G11C 8/16 711/149 |
| 6,216,205 B1 * | 4/2001 | Chin | .......... | G06F 5/12 711/149 |
| 6,748,020 B1 * | 6/2004 | Eifrig | ..................... | H04N 19/40 375/240.26 |
| 7,853,691 B2 | 12/2010 | Elzur et al. | | |
| 8,838,999 B1 | 9/2014 | Sathe et al. | | |
| 8,966,240 B2 | 2/2015 | Chopra | | |

OTHER PUBLICATIONS

V. Govindan et al., "ProTro: A Probabilistic Counter Based Hardware Trojan Attack on FPGA Based MACSec Enabled Ethernet Switch," Space 2019, LNCS 11947, pp. 159-175, 2019.
European Patent Office, Extended European Search Report and European Search Opinion for European patent application 22200244.6 dated Mar. 28, 2023, pp. 1-11.

* cited by examiner

*Primary Examiner* — Zewdu A Beyen
(74) *Attorney, Agent, or Firm* — InventIQ Legal LLP; Steven J. Cahill

(57) ABSTRACT

An electronic network system includes a first transmitter circuit that transmits first bits, a second transmitter circuit that transmits second bits, and a port select circuit. The port select circuit includes a first buffer circuit that stores first words in a first packet of the first bits received from the first transmitter circuit, a second buffer circuit that stores second words in a second packet of the second bits received from the second transmitter circuit, and a multiplexer circuit that receives the first words from the first buffer circuit and the second words from the second buffer circuit. The multiplexer circuit interleaves the second words with the first words in an output signal such that a first one of the second words is provided in the output signal after a first one of the first words and before a second one of the first words.

21 Claims, 7 Drawing Sheets

NETWORK SYSTEMS AND METHODS FOR WORD BASED ARBITRATION OF DATA

FIELD OF THE DISCLOSURE

The present disclosure relates to electronic circuits, and more particularly, to network systems and method for word based arbitration of data.

BACKGROUND

MACSEC is a network security standard that provides secure communications for data traffic on Ethernet links. The MACSEC standard specifies a set of protocols that meet the security requirements for protecting data traversing Ethernet local area networks (LANs) between computing devices. MACSEC defines a security infrastructure to provide data confidentiality, data integrity and data origin authentication by media access independent protocols and entities. MACSEC operates at the medium (or media) access control layer (MAC) within the data link layer of the Open Systems Interconnection model (i.e., the OSI model). MACSEC is also referred to as the Institute of Electrical and Electronics Engineers (IEEE) 802.1AE standard.

DETAILED DESCRIPTION

Network devices that support the MACSEC security standard for Ethernet local area networks (LANs) typically have fixed port configurations that cannot be reconfigured during runtime. In order to increase the bit rate of the data transmitted through a MACSEC network device, the hardware and/or software of the device typically needs to be upgraded. For example, in order to increase the bit rate of a MACSEC network device from 10 Gigabit (G)/40G (10G/40G) Ethernet to 25G/50G/100G Ethernet, the hardware and software of the MACSEC network device typically needs to be upgraded to support a different configuration for the increased bit rate. In addition, MACSEC network devices typically perform arbitration of data on a per packet basis.

According to some examples disclosed herein, a computer network device includes network controllers having transmitter and receiver circuits, a security controller, and transmitter and receiver port select and deselect circuits. The receiver port select circuit interleaves words from different packets of bits that are received at different ports from a set of the transmitter circuits. The interleaved words are provided to the security controller. The receiver port deselect circuit deinterleaves the interleaved words received from the security controller to regenerate the packets of bits at each of the ports. The packets of bits are then provided to a set of the receiver circuits. The transmitter port select circuit interleaves words from different packets of bits that are received at different ports from another set of the transmitter circuits. The interleaved words are provided to the security controller. The transmitter port deselect circuit deinterleaves the interleaved words received from the security controller to regenerate the packets of bits at each of the ports. The packets of bits are then provided to another set of the receiver circuits. The transmitter and receiver port select and deselect circuits can support dynamic changes in the bit rate of the packets being transmitted by the network controllers during runtime, as described in more detail below.

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices that allows the transfer of information between circuits. The term "circuit" may mean one or more passive and/or active electrical components that are arranged to cooperate with one another to provide a desired function.

Figure 1:
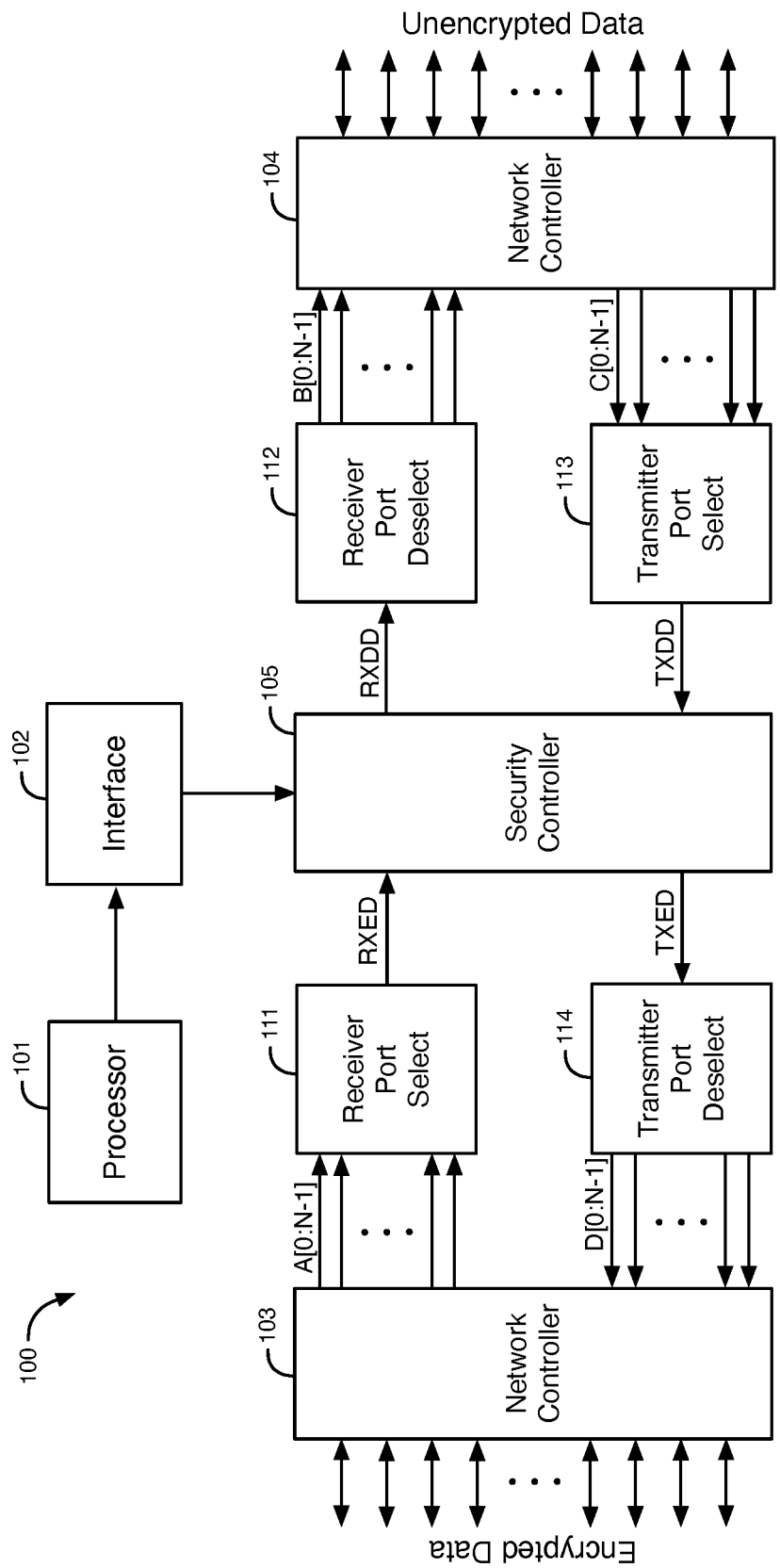
FIG. 1 illustrates an example of an electronic network system that supports word based arbitration and dynamic reconfiguration during runtime to implement a change in the bit rate of bits being transmitted between network controllers.

FIG. 1 illustrates an example of an electronic network system 100 that supports word based arbitration and dynamic reconfiguration during runtime to implement a change in the bit rate of bits being transmitted between network controllers. The network system of Figure (FIG. 1 includes a processor circuit 101, an interface circuit 102, network controller circuits 103-104, security controller circuit 105, receiver port select circuit 111, receiver port deselect circuit 112, transmitter port select circuit 113, and transmitter port deselect circuit 114. Controller circuits 103-105 and port select/deselect circuits 111-114 may be in multiple integrated circuits or in a single integrated circuit (IC), such as a microprocessor IC, a programmable logic IC, or a graphics processing unit IC. Programmable logic ICs include any integrated circuits that can be programmed to perform desired functions, including programmable logic arrays (PLAs), programmable array logic (PAL), field programmable gate arrays (FPGAs), and programmable logic devices (PLDs). Processor circuit 101 may, for example, be in a separate IC.

The network system 100 of Figure (FIG. 1 may, for example, couple together computing devices in an Ethernet local area network (LAN). Network controller circuit 103 may receive encrypted data from one or more computing devices (not shown) in the Ethernet LAN (e.g., through an Ethernet cable). Network controller circuit 103 includes transmitter and receiver circuits (e.g., transceivers) that transmit and receive data according to a networking communication standard, such as an Ethernet standard. Transmitter circuits in network controller circuit 103 provide an N number of signals A[0:N-1] that indicate the received encrypted data to receiver port select circuit 111. The encrypted data may include packets of bits. Each of the packets includes multiple words of bits. Each of these words may include several bits of information (i.e., digital bits). For example, each word may include 64, 128, 256, 512, or 1024 bits of information.

Each of the N number of signals A[0:N-1] is provided to a different port in receiver port select circuit 111 through conductors (e.g., wires in one or more conductive layers of an IC or package). N may be any integer greater than 1. Receiver port select circuit 111 performs word based arbitration from each of the ports. Instead of outputting the bits in an entire packet from one port together, receiver port select circuit 111 interleaves words in the packets at each of the ports to generate an interleaved data stream in its output signal RXED. Output signal RXED may be a serial signal or parallel signals. Receiver port select circuit 111 may cause the packets from each port to have the average latency regardless of the packet size. Receiver port select circuit 111 may also prevent small packets from being blocked by larger packets from other ports. Receiver port select circuit 111 is disclosed in more detail herein with respect to FIGS. 2A-2C.

The output signal RXED of receiver port select circuit 111 is provided to an input of security controller circuit 105 through one or more conductors. Security controller circuit 105 may be, for example, a controller that supports the MACSEC security standard for Ethernet local area networks (LANs). Security controller circuit 105 may, for example, decrypt the data indicated by signal RXED using a decryption key to generate decrypted data in output signal RXDD. Alternatively, security controller circuit 105 may decrypt data received from processor circuit 101 through interface 102 using a decryption key to generate decrypted data in output signal RXDD. Output signal RXDD is provided through one or more conductors to receiver port deselect circuit 112.

Receiver port deselect circuit 112 separates the unencrypted words (e.g., the decrypted words) received in signal RXDD to regenerate each of the individual packets by providing each of the words to the corresponding one of the ports that the word was received from in signals A[0:N-1]. Receiver port deselect circuit 112 is disclosed herein in more detail with respect to FIG. 3. Receiver port deselect circuit 112 outputs an N number of signals B[0:N-1]. Each of the output signals B[0:N-1] includes packets of bits from only one of the ports. The packets include unencrypted data from receiver port select circuit 111 (or from processor circuit 101).

Network controller circuit 104 includes transmitter and receiver circuits (e.g., transceivers) that transmit and receive data according to a networking communication standard, such as an Ethernet standard. The output signals B[0:N-1] of receiver port deselect circuit 112 are provided to receiver circuits in network controller circuit 104 through conductors. Network controller circuit 104 provides the packets of unencrypted data indicated by signals B[0:N-1] to one or more computing devices (not shown) in the Ethernet LAN (e.g., through an Ethernet cable).

Network controller circuit 104 may receive unencrypted data from one or more computing devices (not shown) in the Ethernet LAN (e.g., through an Ethernet cable).

Transmitter circuits in network controller circuit 104 transmit an N number of signals C[0:N-1] that indicate the received unencrypted data to transmitter port select circuit 113 through conductors. The unencrypted data indicated by signals C[0:N-1] includes packets of bits. Each of the packets includes multiple words. Each of these words may include several bits of information. For example, each word may include 64, 128, 256, 512, or 1024 bits of information.

Each of the N number of signals C[0:N-1] is provided to a different port in transmitter port select circuit 113. Transmitter port select circuit 113 performs word based arbitration from each of the ports. Transmitter port select circuit 113 interleaves words from the packets at each of the ports to generate an interleaved data stream in its output signal TXDD. Output signal TXDD may be a serial signal or parallel signals. Transmitter port select circuit 113 may cause packets from each port to have the average latency regardless of the packet size. Transmitter port select circuit 113 may also prevent small packets from being blocked by larger packets from other ports. Transmitter port select circuit 113 is disclosed herein in more detail with respect to FIG. 4.

The output signal TXDD of transmitter port select circuit 113 is provided to an input of security controller circuit 105 through one or more conductors. Security controller circuit 105 may, for example, encrypt the words of data indicated by signal TXDD using an encryption key to generate encrypted words of data in output signal TXED. Alternatively, security controller circuit 105 may encrypt data received from processor circuit 101 through interface 102 using an encryption key to generate encrypted data in output signal TXED. Output signal TXED is provided to an input of transmitter port deselect circuit 114 through one or more conductors as serial or parallel data.

Transmitter port deselect circuit 114 separates the encrypted interleaved data words received in signal TXED to regenerate each of the individual packets by providing each of the words to the corresponding one of the ports that the word was received from in signals C[0:N-1]. Transmitter port deselect circuit 114 is disclosed herein in more detail with respect to FIG. 5. Transmitter port deselect circuit 114 outputs an N number of signals D[0:N-1]. Each of the N output signals D[0:N-1] includes packets from only one of the ports. The packets are from transmitter port select circuit 113 or from processor circuit 101. The output signals D[0:N-1] of transmitter port deselect circuit 114 are provided through conductors to receiver circuits in network controller circuit 103. Network controller circuit 103 provides the encrypted packets of data indicated by signals D[0:N-1] to one or more computing devices (not shown) in the Ethernet LAN (e.g., through an Ethernet cable).

Figure 2A:
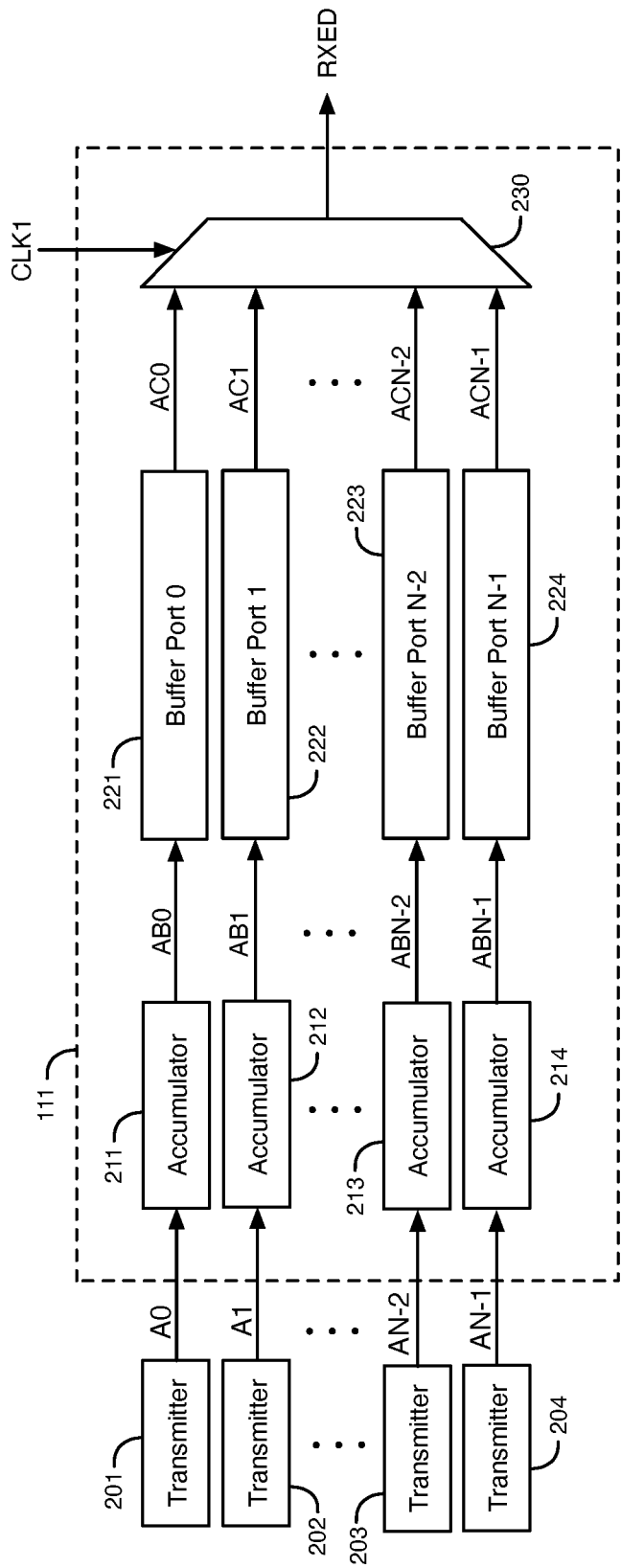
FIG. 2A is a diagram that illustrates details of an example of the receiver port select circuit of FIG. 1.

FIG. 2A is a diagram that illustrates details of an example of the receiver port select circuit 111 of FIG. 1. FIG. 2A illustrates 4 accumulator circuits 211-214, 4 buffer circuits 221-224 at 4 ports, and a multiplexer circuit 230 in receiver port select circuit 111. FIG. 2A also illustrates 4 transmitter circuits 201-204 that are in network controller circuit 103. It should be understood that receiver port select circuit 111 may include any number N of accumulator circuits and any number N of buffer circuits corresponding to N ports and that network controller circuit 103 may include a corresponding number N of transmitter circuits. Transmitter circuits 201-204 may, for example, be part of transceiver circuits in channel circuits in network controller circuit 103.

Transmitter circuits 201-204 transmit signals A0, A1, AN-2, and AN-1 (i.e., signals A[0:N-1]) to inputs of accumulator circuits 211-214, respectively. Each of the accumulator circuits 211-214 may include, for example, a first-in-first-out (FIFO) buffer circuit. Accumulator circuits 211-214 store and accumulate bits received in signals A0, A1, AN-2, and AN-1 into words (e.g., using FIFO buffer circuits that are responsive to a clock signal) and then provide the accumulated words to buffer circuits 221-224 as signals AB0, AB1, ABN-2, and ABN-1, respectively.

The buffer circuits 221, 222, 223, and 224 correspond to ports 0, 1, N-2, and N-1, respectively. Each of the buffer circuits 221-224 may include, for example, a FIFO buffer circuit that is responsive to a clock signal. The buffer circuits 221-224 store the words received in signals AB0, AB1, ABN-2, and ABN-1, respectively, in response to a clock signal. Each of the buffer circuits 221-224 may, for example, store an entire packet of words received in a respective one of signals AB0, AB1, ABN-2, and ABN-1. Buffer circuits 221, 222, 223, and 224 provide the words to four data inputs of multiplexer circuit 230 as signals AC0, AC1, ACN-2, and ACN-1, respectively. A clock signal CLK1 is provided to a select input of multiplexer circuit 230. Multiplexer circuit 230 provides words of bits received from buffer circuits 221-224 to its output signal RXED in response to clock signal CLK1. Multiplexer circuit 230 interleaves the words received in signals AC0, AC1, . . . . ACN-2, ACN-1 from buffer circuits 221-224 to generate a data stream in its output signal RXED that has interleaved words of bits from ports 0, 1, . . . . N-2, N-1, respectively, provided in sequential order in response to clock signal CLK1.

Figure 2B:
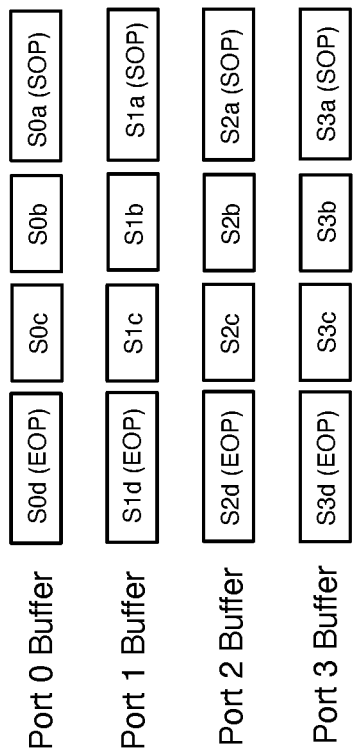
FIG. 2B is a diagram that illustrates examples of packets of words stored in four of the buffer circuits in the receiver port select circuit of FIG. 2A.

FIG. 2B is a diagram that illustrates examples of packets of words stored in four of the buffer circuits in the receiver port select circuit 111 of FIG. 2A. In the example of FIG. 2B, the buffer circuit 221 for port 0 stores 4 words S0a, S0b, S0c, and S0d received from signal AB0. Words S0a, S0b, S0c, and S0d form a first packet in this example. The buffer circuit 222 for port 1 stores 4 words S1a, S1b, S1c, and S1d received from signal AB1. Words S1a, S1b, S1c, and S1d form a second packet in this example. The buffer circuit for port 2 (e.g., buffer circuit 223) stores 4 words S2a, S2b, S2c, and S2d received from signal AB2 (e.g., signal ABN-2). Words S2a, S2b, S2c, and S2d for a third packet in this example. The buffer circuit for port 3 (e.g., buffer circuit 224) stores 4 words S3a, S3b, S3c, and S3d received from signal AB3 (e.g., signal ABN-1). Words S3a, S3b, S3c, and S3d form a fourth packet in this example. Words S0a, S1a, S2a, and S3a are start of packet (SOP) words for the corresponding 4 packets. Words S0d, S1d, S2d, and S3d are end of packet (EOP) words for the corresponding 4 packets.

Figure 2C:
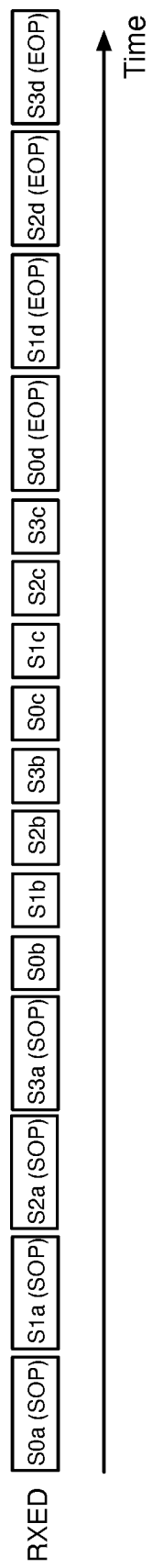
FIG. 2C is a timing diagram that illustrates examples of words from each of the 4 packets shown in FIG. 2B that have been interleaved in the output signal of the multiplexer circuit in the receiver port select circuit of FIG. 1.

FIG. 2C is a timing diagram that illustrates examples of words from each of the 4 packets shown in FIG. 2B that have been interleaved in the output signal RXED of multiplexer circuit 230. Multiplexer circuit 230 may output a word from a packet at a different one of the ports in each clock cycle of CLK1, in each fraction of a clock cycle of CLK1, or in multiple clock cycles of CLK1. Multiplexer circuit 230 causes words from ports 0, 1, 2, and 3 to be interleaved and provided sequentially in output signal RXED in the order in which the words are received, starting with the SOP words and ending with the EOP words, as shown in FIG. 2C. Thus, in the example of FIG. 2C, words from the packets are provided at the output of multiplexer circuit 230 in signal RXED in the order of S0a, S1a, S2a, S3a, S0b, S1b, S2b, S3b, S0c, S1c, S2c, S3c, S0d, S1d, S2d, and S3d.

Figure 3:
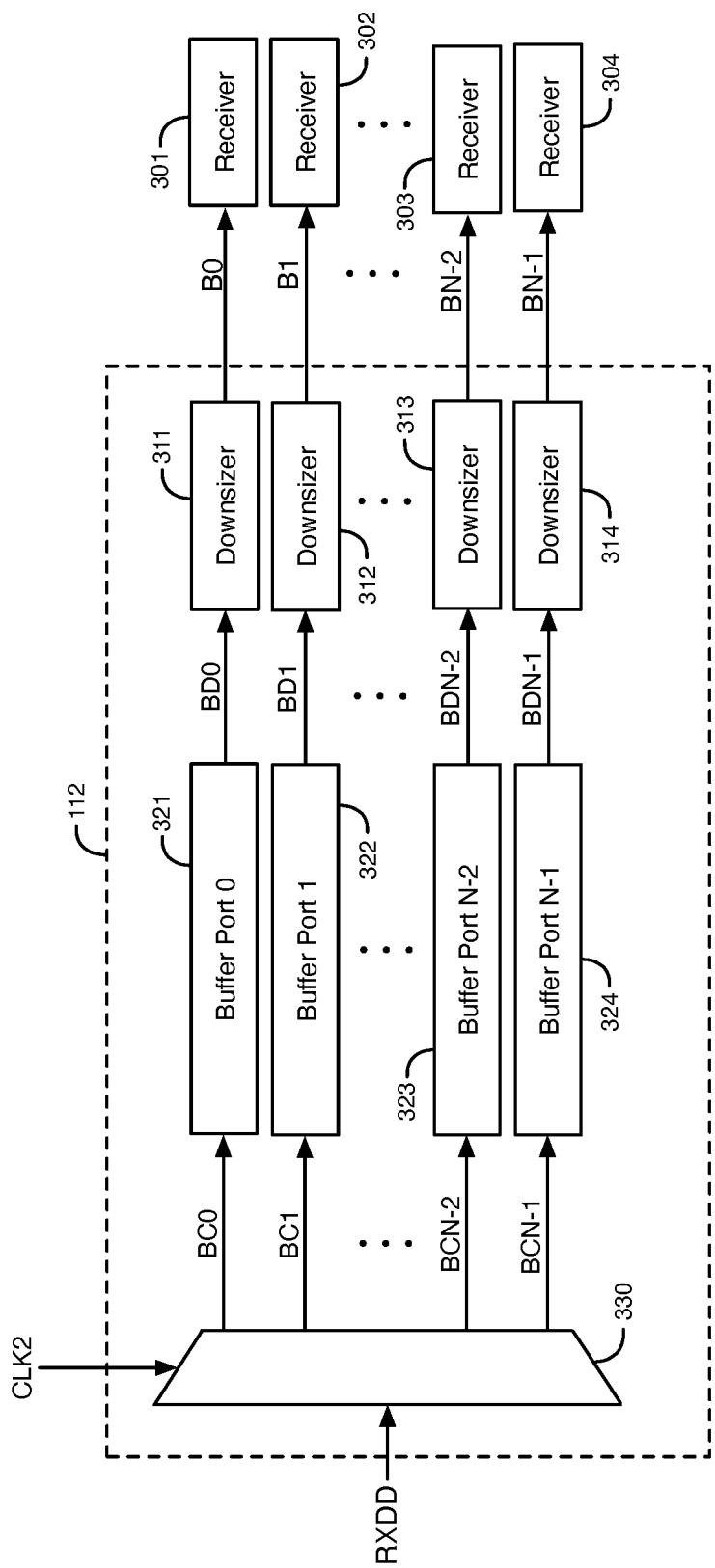
FIG. 3 is a diagram that illustrates details of an example of the receiver port deselect circuit of FIG. 1.

FIG. 3 is a diagram that illustrates details of an example of the receiver port deselect circuit 112 of FIG. 1. FIG. 3 illustrates 4 downsizer circuits 311-314, 4 buffer circuits 321-324, and a demultiplexer circuit 330 in receiver port deselect circuit 112. FIG. 3 also illustrates 4 receiver circuits 301-304 that are in network controller circuit 104. It should be understood that receiver port deselect circuit 112 may include any number N of downsizer circuits and any number N of buffer circuits corresponding to N ports and that network controller circuit 104 may include a corresponding number N of receiver circuits. Receiver circuits 301-304 may, for example, be part of transceiver circuits in channel circuits in network controller circuit 104.

Data signal RXDD is provided to a data input of demultiplexer circuit 330 from security controller 105. A clock signal CLK2 is provided to a select input of demultiplexer circuit 330. Demultiplexer circuit 330 provides each word of bits received in signal RXDD to one of the buffer circuits 321-324 as one of signals BC0, BC1, BCN-2, and BCN-1, respectively, in response to clock signal CLK2. Demultiplexer circuit 330 separates (i.e., deinterleaves) the interleaved words received in signal RXDD to provide an N number of signals BC0, BC1, . . . . BCN-2, BCN-1 at the N ports 0, 1, . . . . N-2, N-1 corresponding to buffer circuits 321-324, respectively, in response to clock signal CLK2. Demultiplexer circuit 330 provides each of the words received in signal RXDD to the same port in buffer circuits 321-324 that the word was received in the corresponding one of buffer circuits 221-224. Using the examples of FIGS. 2B-2C, demultiplexer circuit 330 provides words S0a, S0b, S0c, and S0d to buffer circuit 321. Demultiplexer circuit 330 provides words S1a, S1b, S1c, and S1d to buffer circuit 322. Demultiplexer circuit 330 provides words S2a, S2b, S2c, and S2d to buffer circuit 323. Demultiplexer circuit 330 provides words S3a, S3b, S3c, and S3d to buffer circuit 324.

The words received in signals BC0, BC1, BCN-2, and BCN-1 are stored in buffer circuits 321, 322, 323, and 324, respectively, in response to a clock signal. The buffer circuits 321, 322, 323, and 324 correspond to ports 0, 1, N-2, and N-1, respectively. Each of the buffer circuits 321-324 may, for example, include a FIFO circuit that outputs each word received from demultiplexer circuit 330 in a first-in-first-out order in response to a clock signal. Each of the buffer circuits 321-324 may, for example, store an entire packet of words received in a respective one of signals BC0, BC1, BCN-2, and BCN-1.

Buffer circuits 321-324 output the words received from demultiplexer circuit 330 in output signals BD0, BD1, . . . . BDN-2, BDN-1, respectively. Downsizer circuits 311-314 include buffer circuits that store the words received from buffer circuits 321-324 in signals BD0, BD1, . . . . BDN-2, BDN-1, respectively. Downsizer circuits 311-314 may, for example, separate bits in each of the words received in signals BD0, BD1, . . . . BDN-2, BDN-1 to generate smaller groups of bits (e.g., bytes) in output signals B0, B1, . . . . BN-2, BN-1, respectively, (i.e., signals B[0:N-1]). Signals B0, B1, . . . . BN-2, BN-1 are provided to inputs of receiver circuits 301-304, respectively, in network controller circuit 104. Network controller circuit 104 may provide the unencrypted data indicated by signals B0, B1, . . . . BN-2, BN-1 to other computing devices in the LAN.

Figure 4:
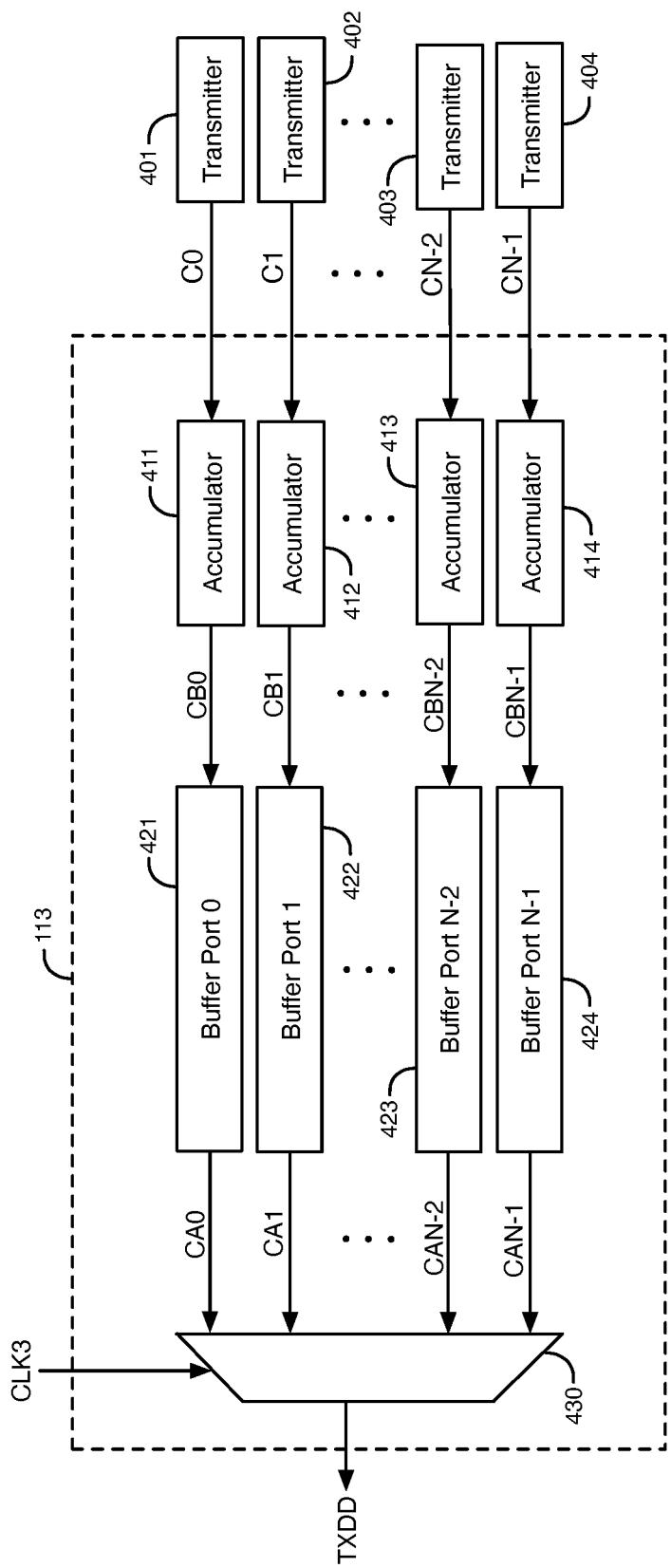
FIG. 4 is a diagram that illustrates details of an example of the transmitter port select circuit of FIG. 1.

FIG. 4 is a diagram that illustrates details of an example of the transmitter port select circuit 113 of FIG. 1. FIG. 4 illustrates 4 accumulator circuits 411-414, 4 buffer circuits 421-424, and a multiplexer circuit 430 in transmitter port select circuit 113. FIG. 4 also illustrates 4 transmitter circuits 401-404 that are in network controller circuit 104. It should be understood that transmitter port select circuit 113 may include any number N of accumulator circuits and any number N of buffer circuits corresponding to N ports and that network controller circuit 104 may include a corresponding number N of transmitter circuits. Transmitter circuits 401-404 may, for example, be part of transceiver circuits in channel circuits in network controller circuit 104.

Transmitter circuits 401-404 transmit signals C0, C1, CN-2, and CN-1 (i.e., signals C[0:N-1]) to inputs of accumulator circuits 411-414, respectively. Each of the accumulator circuits 411-414 may include, for example, a FIFO buffer circuit. Accumulator circuits 411-414 store and accumulate bits received in signals C0, C1, CN-2, and CN-1 into words (e.g., using FIFO buffer circuits responsive to a clock signal) and then provide the accumulated words to buffer circuits 421-424 as signals CB0, CB1, CBN-2, and CBN-1, respectively.

The buffer circuits 421, 422, 423, and 424 correspond to ports 0, 1, N-2, and N-1, respectively. Each of the buffer circuits 421-424 may include, for example, a FIFO buffer circuit. The buffer circuits 421-424 store words received in signals CB0, CB1, CBN-2, and CBN-1 from accumulator circuits 411-414, respectively. Each of the buffer circuits 421-424 may, for example, store an entire packet of words received in a respective one of signals CB0, CB1, CBN-2, and CBN-1. Buffer circuits 421, 422, 423, and 424 provide the words in each of the packets to four data inputs of multiplexer circuit 430 as signals CA0, CA1, CAN-2, and CAN-1, respectively. A clock signal CLK3 is provided to a select input of multiplexer circuit 430. Multiplexer circuit 430 provides the words received from buffer circuits 421-424 to its output signal TXDD in response to clock signal CLK3. Multiplexer circuit 430 interleaves the words received in signals CA0, CA1, CAN-2, and CAN-1 from buffer circuits 421-424 to generate a data stream in its output signal TXDD that has interleaved words of bits from the ports 0, 1, . . . . N-2, N-1, respectively, in sequential order in response to clock signal CLK3, as disclosed herein, for example, with respect to FIGS. 2B-2C.

Figure 5:
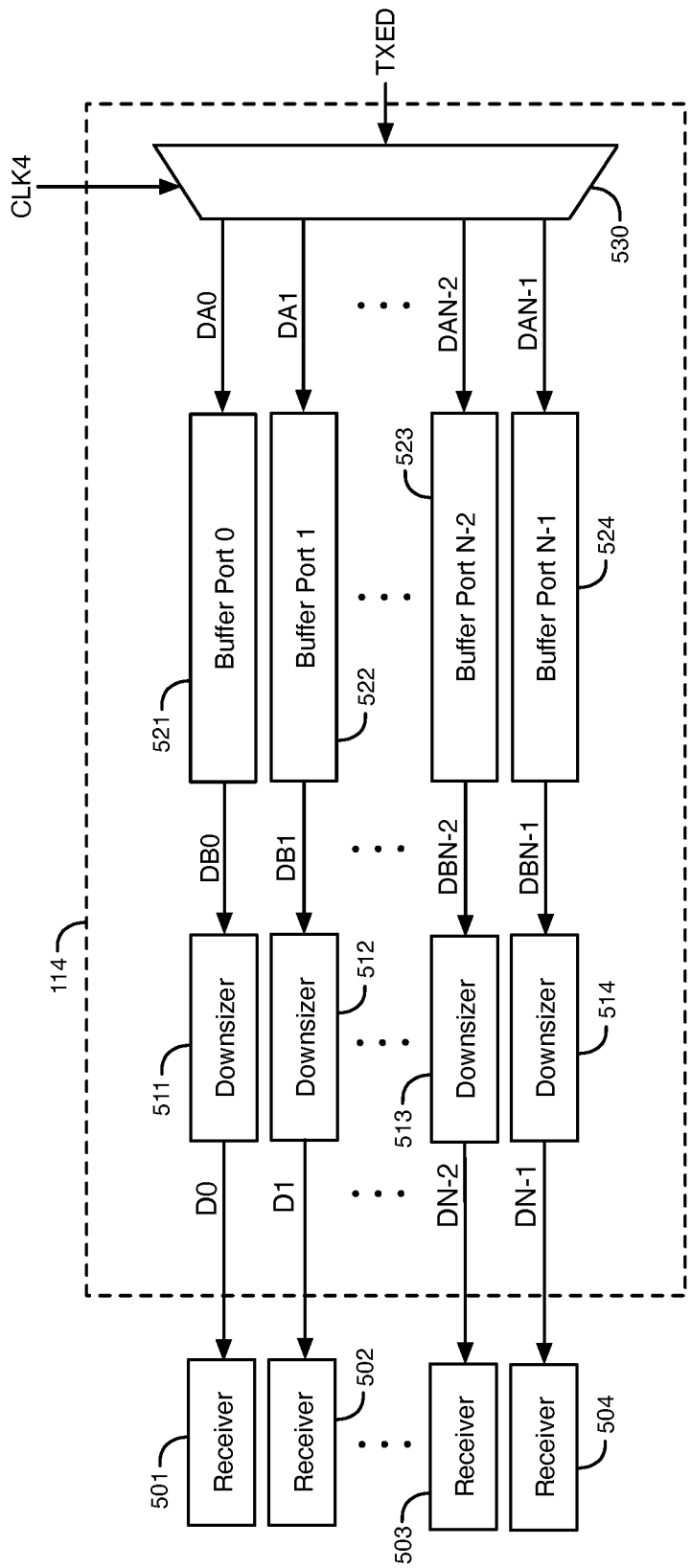
FIG. 5 is a diagram that illustrates details of an example of the transmitter port deselect circuit of FIG. 1.

FIG. 5 is a diagram that illustrates details of an example of the transmitter port deselect circuit 114 of FIG. 1. FIG. 5 illustrates 4 downsizer circuits 511-514, 4 buffer circuits 521-524, and a demultiplexer circuit 530 in transmitter port deselect circuit 114. FIG. 5 also illustrates 4 receiver circuits 501-504 that are in network controller circuit 103. It should be understood that transmitter port deselect circuit 114 may include any number N of downsizer circuits and any number N of buffer circuits corresponding to N ports and that network controller circuit 103 may include a corresponding number N of receiver circuits. Receiver circuits 501-504 may, for example, be part of transceiver circuits in channel circuits in network controller circuit 103.

Data signal TXED is provided to a data input of demultiplexer circuit 530 from security controller 105. A clock signal CLK4 is provided to a select input of demultiplexer circuit 530. Demultiplexer circuit 530 provides each word of bits received in signal TXED to one of buffer circuits 521-524 as one of signals DA0, DA1, DAN-2, and DAN-1, respectively, in response to clock signal CLK4. Demultiplexer circuit 530 separates (i.e., deinterleaves) the interleaved words received in signal TXED to provide an N number of signals DA0, DA1, . . . . DAN-2, DAN-1 to the N ports 0, 1, . . . . N-2, N-1 corresponding to buffer circuits 521-524, respectively, in response to clock signal CLK4. Demultiplexer circuit 530 provides each of the words received in signal TXED to the same port in buffer circuits 521-524 that the word was received in the corresponding one of buffer circuits 421-424. Using the examples of FIGS. 2B-2C, demultiplexer circuit 530 provides words S0a, S0b, S0c, and S0d to buffer circuit 521. Demultiplexer circuit 530 provides words S1a, S1b, S1c, and S1d to buffer circuit 522. Demultiplexer circuit 530 provides words S2a, S2b, S2c, and S2d to buffer circuit 523. Demultiplexer circuit 530 provides words S3a, S3b, S3c, and S3d to buffer circuit 524.

The words received in signals DA0, DA1, DAN-2, and DAN-1 are stored in buffer circuits 521, 522, 523, and 524, respectively. The buffer circuits 521, 522, 523, and 524 correspond to ports 0, 1, N-2, and N-1, respectively. Each of the buffer circuits 521-524 may, for example, include a FIFO circuit that outputs each word received from demultiplexer circuit 530 in a first-in-first-out order in response to a clock signal. Each of the buffer circuits 521-524 may, for example, store an entire packet of words received in a respective one of signals DA0, DA1, DAN-2, and DAN-1.

Buffer circuits 521-524 provide the words received from demultiplexer circuit 530 to downsizer circuits 511-514 in N output signals DB0, DB1, . . . . DBN-2, DBN-1, respectively. Downsizer circuits 511-514 include buffer circuits that store the words received from buffer circuits 521-524 in signals DB0, DB1, . . . . DBN-2, DBN-1, respectively. Downsizer circuits 511-514 may, for example, separate bits in each of the words received in signals DB0, DB1, . . . . DBN-2, DBN-1 to generate smaller groups of bits (e.g., bytes) in output signals D0, D1, . . . . DN-2, DN-1, respectively, (i.e., signals D[0:N-1]. Signals D0, D1, . . . . DN-2, DN-1 are provided to inputs of receiver circuits 501-504, respectively, in network controller circuit 103. Network controller circuit 103 may provide the encrypted data indicated by signals D0, D1, . . . . DN-2, DN-1 to other computing devices in the LAN.

According to some examples of the network system 100 of FIG. 1, channel circuits in the network controller circuits 103-104 can be dynamically reconfigured during runtime to cause a change in the bit rate of bits being transmitted and received by the network controllers 103-104. The transmitter and receiver port select and deselect circuits 111-114 can support the transmission of bits both before and after dynamic reconfiguration. According to a specific example that is not intended to be limiting, Table 1 below shows examples of the bit rates of bits in gigabits per second (Gbps) provided through network system 100 of FIG. 1 both before and after the bit rate has been changed using dynamic reconfiguration (DR).

TABLE 1

| Channel | Transmitter/Receiver Bit Rate | | Bit Width |
|---------|-----------|----------|-----------|
|         | Before DR | After DR |           |
| 1       | 10 Gbps   | 25 Gbps  | 128       |
| 2       | 10 Gbps   | 25 Gbps  | 128       |
| 10      | 10 Gbps   | 25 Gbps  | 128       |
| 11      | 10 Gbps   | 25 Gbps  | 128       |

In the example of Table 1, four channel circuits 1, 2, 10 and 11 in each of network controller circuits 103-104 initially operate at 10 Gbps to transmit and receive bits using the transmitter/receiver port select/deselect circuits 111-114 and security controller circuit 105. Receiver port select and deselect circuits 111-112 are configured to arbitrate bits received from transmitter circuits in channel circuits 1 and 2 in network controller 103, with a 128 bit width on each port. Transmitter port select and deselect circuits 113-114 are configured to arbitrate bits received from transmitter circuits in channel circuits 10 and 11 in network controller 104, with a 128 bit width on each port.

Prior to dynamically reconfiguring network system 100, a user stops the flow of bits into transmitter/receiver port select/deselect circuits 111-114 and security controller circuit 105. Then, when there are no more bits to be processed by these circuits, the dynamic reconfiguration process is initiated on all 4 channel circuits 1, 2, 10, and 11 in network controllers 103-104 from 10 Gbps to 25 Gbps. In each of the port select/deselect circuits 111-114, the buffer circuits for the ports may be used to interleave/deinterleave the words of bits as described above both before and after dynamic reconfiguration from 10 Gbps to 25 Gbps. During the dynamic reconfiguration process, a user can, for example, reprogram network system 100 following an encryption rekeying process or reuse the existing security information. After dynamic reconfiguration, the transmission of bits through network system 100 can be resumed.

According to another specific example that is not intended to be limiting, Table 2 below shows examples of the bit rates of bits provided through network system 100 both before and after the bit rate has been changed by dynamically reconfiguring network controller circuits 103-104. In the example of Table 2, 8 channel circuits in each of the network controller circuits 103-104 are used to transmit and receive data prior to dynamic reconfiguration, and 2 channel circuits in each of the network controller circuits 103-104 are used to transmit and receive data after dynamic reconfiguration (DR).

TABLE 2

| Channel | Transmitter/Receiver Bit Rate | | Bit Width |
|---|---|---|---|
| | Before DR | After DR | |
| 0 | 25 Gbps | Unused | 256 |
| 1 | 25 Gbps | | 256 |
| 2 | 25 Gbps | | 256 |
| 3 | 25 Gbps | | 256 |
| 4 | Unused | 100 Gbps | 256 |
| 10 | 25 Gbps | Unused | 256 |
| 11 | 25 Gbps | | 256 |
| 12 | 25 Gbps | | 256 |
| 13 | 25 Gbps | | 256 |
| 14 | Unused | 100 Gbps | 256 |

In the example of Table 2, 8 channel circuits 0, 1, 2, 3, 10, 11, 12, and 13 in each of network controller circuits 103-104 initially operate at 25 Gbps to transmit and receive bits using the transmitter/receiver port select/deselect circuits 111-114 and security controller circuit 105. Receiver port select and deselect circuits 111-112 are configured to arbitrate bits received from transmitter circuits in channel circuits 0, 1, 2, and 3 in network controller 103, with a 256 bit width on each port. Transmitter port select and deselect circuits 113-114 are configured to arbitrate bits received from transmitter circuits in channel circuits 10, 11, 12, and 13 in network controller 104, with a 256 bit width on each port.

Prior to dynamically reconfiguring network system 100, a user stops the flow of bits into transmitter/receiver port select/deselect circuits 111-114 and security controller circuit 105. Then, when there are no more bits to be processed by these circuits, the dynamic reconfiguration process is initiated on the channel circuits 0-4 and 10-14 in network controllers 103-104. During the dynamic reconfiguration process, channel circuits 0-3 and 10-13 in network controllers 103-104 are disabled from transmitting and receiving bits, and channel circuits 4 and 14 in network controllers 103-104 are enabled to transmit and receive bits. As shown in Table 2, before dynamic reconfiguration, channel circuits 4 and 14 are unused for transmitting and receiving bits. After dynamic reconfiguration, channel circuits 0-3 and 10-13 are unused for transmitting and receiving bits, and channel circuits 4 and 14 transmit and receive bits at a bit rate of 100 Gbps. In each of the port select/deselect circuits 111-114, the buffer circuits for the 4 ports may be used to interleave/deinterleave the words as described above before dynamic reconfiguration, and the buffer circuit for the 1 port may be used to interleave/deinterleave the words after dynamic reconfiguration. During dynamic reconfiguration, a user can, for example, reprogram network system 100 following an encryption rekeying process or reuse the existing security information. After dynamic reconfiguration, the transmission of bits through network system 100 can be resumed.

According to another example that is applicable to 5G (the 5$^{th}$ generation mobile network), 10 channel circuits 0-9 in network controllers 103-104 and corresponding ports in port select/deselect circuits 111-114 may be used to transmit bits at 10 Gbps (for a total bit rate of 100 Gbps) for a network slice 0 to stream video content. Channel circuits 41-45 in network controller circuits 103-104 and corresponding ports in port select/deselect circuits 111-114 may be used to transmit bits at 10 Gbps (for a total bit rate of 50 Gbps) for a second network slice 1 to stream generic broadband data. Channel circuits 10-40 and 46-53 are unused in this example. If the streaming video content bandwidth exceeds the maximum bandwidth supported by network slice 0 in channel circuits 0-9, dynamic reconfiguration of network system 100 is performed to increase the bandwidth. The user can either perform dynamic reconfiguration on channel circuits 0-9 to increase the Ethernet bit rate from 10 Gbps to 25 Gbps or configure new channel circuits (e.g., ports 10 and up) and corresponding ports in circuits 111-114 to handle the additional bandwidth. Similarly, Ethernet port dynamic reconfiguration can be performed if the port bandwidth required is reduced to save power.

Figure 6:
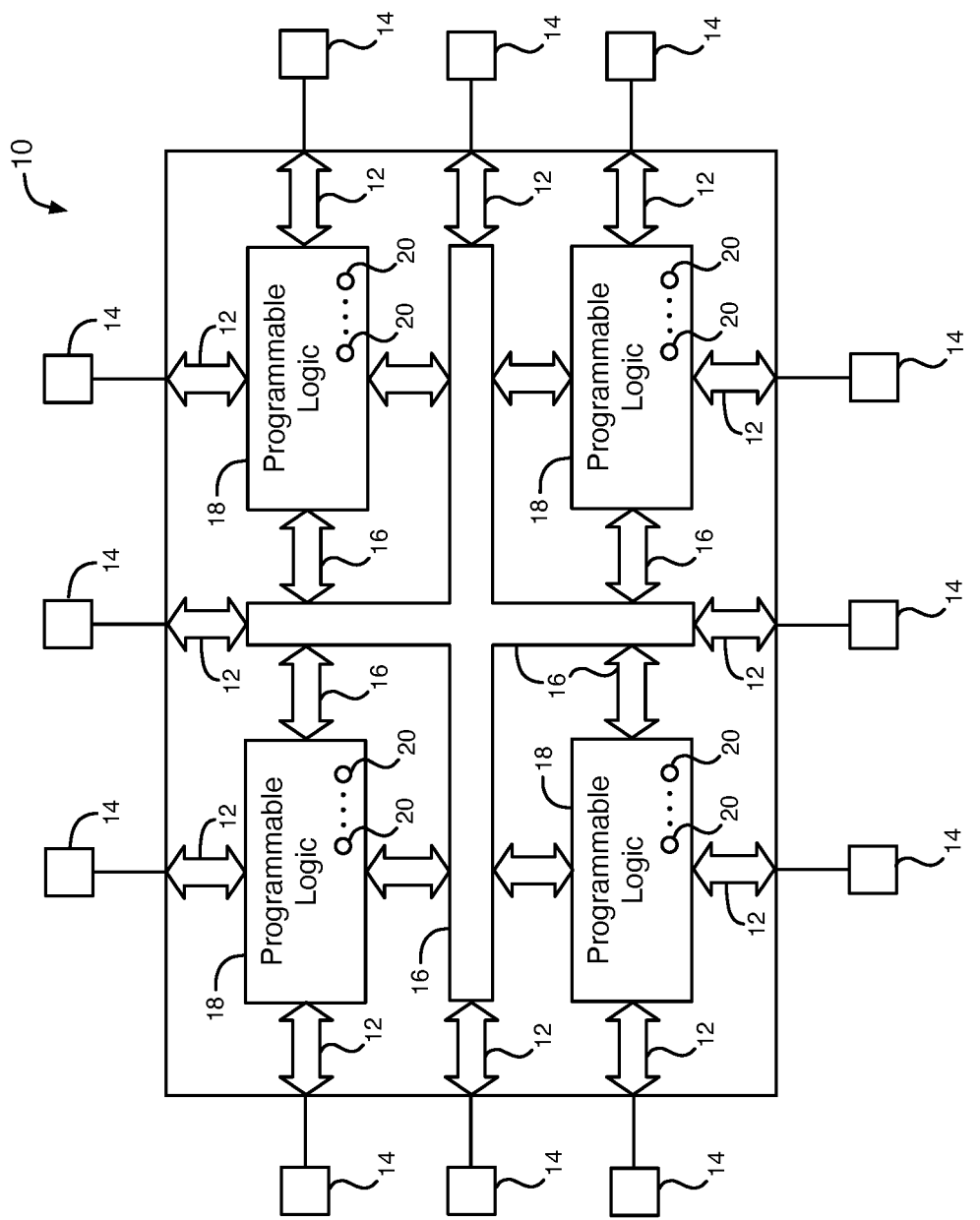
FIG. 6 is a diagram of an illustrative example of a programmable logic integrated circuit.

An illustrative programmable logic integrated circuit (IC) 10 that includes one or more network systems 100 is shown in FIG. 6. As shown in FIG. 6, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. The programmable logic circuitry 18 may be configured to perform custom logic functions according to a custom design for IC 10. A network system 100 may, for example, be implemented using the programmable logic circuitry 18 and may use input-output circuitry 12 and input-output pads 14 to exchange data with external devices.

Programmable logic IC 10 contains memory elements 20 that can be loaded with configuration data (also called programming data) using pads 14 and input-output circuitry 12. Once loaded, the memory elements 20 may each provide a corresponding static control output signal that controls the state of an associated logic component in programmable logic circuitry 18. Typically, the memory element output signals are used to control the gates of metal-oxide-semiconductor (MOS) transistors. In the context of programmable integrated circuits, memory elements 20 store configuration data and are sometimes referred to as configuration random-access memory (CRAM) cells.

In general, software and data for performing any of the functions disclosed herein (e.g., by controller circuits 103-105) may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now described. Example 1 is an electronic network system comprising: a first transmitter circuit that transmits first bits; a second transmitter circuit that transmits second bits; and a port select circuit comprising a first buffer circuit that stores first words in a first packet of the first bits received from the first transmitter circuit, a second buffer circuit that stores second words in a second packet of the second bits received from the second transmitter circuit, and a multiplexer circuit that receives the first words from the first buffer circuit and the second words from the second buffer circuit, and wherein the multiplexer circuit interleaves the second words with the first words in a first output signal such that a first one of the second words in the second packet is provided in the first output signal after a first one of the first words in the first packet and before a second one of the first words in the first packet.

In Example 2, the electronic network system of Example 1 may optionally further comprise: a third transmitter circuit that transmits third bits, wherein the port select circuit further comprises a third buffer circuit that stores third words in a third packet of the third bits received from the third transmitter circuit, wherein the multiplexer circuit receives the third words from the third buffer circuit, and wherein the multiplexer circuit interleaves the first, the second, and the third words in the first output signal such that a first one of the third words in the third packet is provided in the first output signal after the first ones of the first and the second words and before the second one of the first words and a second one of the second words in the second packet.

In Example 3, the electronic network system of Example 2 may optionally further comprise: a fourth transmitter circuit that transmits fourth bits, wherein the port select circuit further comprises a fourth buffer circuit that stores fourth words in a fourth packet of the fourth bits received from the fourth transmitter circuit, wherein the multiplexer circuit receives the fourth words from the fourth buffer circuit, and wherein the multiplexer circuit interleaves the first, the second, the third, and the fourth words in the first output signal in response to a clock signal such that a first one of the fourth words is provided in the first output signal after the first ones of the first, the second, and the third words and before the second ones of the first and the second words and a second one of the third words in the third packet.

In Example 4, the electronic network system of any one of Examples 1-3 may optionally further comprise: a security controller circuit that performs a security function on the first output signal to generate a second output signal indicating the first and the second words; and a port deselect circuit comprising first and second port circuits and a demultiplexer circuit that receives the second output signal, wherein the demultiplexer circuit provides each of the first words to the first port circuit and each of the second words to the second port circuit.

In Example 5, the electronic network system of Example 2 may optionally further comprise: a port deselect circuit comprising a fourth buffer circuit, a fifth buffer circuit, a sixth buffer circuit, and a demultiplexer circuit that receives the first, the second, and the third words, wherein the demultiplexer circuit provides each of the first words to the fourth buffer circuit to regenerate the first packet, each of the second words to the fifth buffer circuit to regenerate the second packet, and each of the third words to the sixth buffer circuit to regenerate the third packet.

In Example 6, the electronic network system of Example 3 may optionally further comprise: a port deselect circuit comprising a fifth buffer circuit, a sixth buffer circuit, a seventh buffer circuit, an eighth buffer circuit, and a demultiplexer circuit that receives the first, the second, the third, and the fourth words, wherein the demultiplexer circuit provides each of the first words to the fifth buffer circuit to regenerate the first packet, each of the second words to the sixth buffer circuit to regenerate the second packet, each of the third words to the seventh buffer circuit to regenerate the third packet, and each of the fourth words to the eighth buffer circuit to regenerate the fourth packet.

In Example 7, the electronic network system of any one of Examples 1-6 may optionally include, wherein the port select circuit further comprises a first accumulator circuit that accumulates the first bits received from the first transmitter circuit into the first words and that provides the first words to the first buffer circuit, and wherein the port select circuit further comprises a second accumulator circuit that accumulates the second bits received from the second transmitter circuit into the second words and that provides the second words to the second buffer circuit.

In Example 8, the electronic network system of any one of Examples 1-7 may optionally include, wherein the first transmitter circuit is dynamically reconfigured to change a transmission speed of the first bits from a first bit rate to a second bit rate that is different than the first bit rate, wherein the second transmitter circuit is dynamically reconfigured to change a transmission speed of the second bits from the first bit rate to the second bit rate, wherein the first buffer circuit stores the first words at each of the first bit rate and the second bit rate, wherein the second buffer circuit stores the second words at each of the first bit rate and the second bit rate, and wherein the multiplexer circuit interleaves the second words with the first words at each of the first bit rate and the second bit rate.

Example 9 is an electronic network system comprising: a port deselect circuit comprising first and second buffer circuits and a demultiplexer circuit that receives first words of first bits from a first packet that are interleaved with second words of second bits from a second packet such that a first one of the second words is received after a first one of the first words in the first packet and before a second one of the first words in the first packet, wherein the demultiplexer circuit provides each of the first words to the first buffer circuit to regenerate the first packet, and wherein the demultiplexer circuit provides each of the second words to the second buffer circuit to regenerate the second packet.

In Example 10, the electronic network system of Example 9 may optionally include, wherein the port deselect circuit further comprises first and second downsizer circuits, wherein the first downsizer circuit separates the first bits in each of the first words received from the first buffer circuit to generate first groups of bits, wherein each of the first groups has less bits than each of the first words, wherein the second downsizer circuit separates the second bits in each of the second words received from the second buffer circuit to generate second groups of bits, and wherein each of the second groups has less bits than each of the second words.

In Example 11, the electronic network system of any one of Examples 9-10 may optionally further comprise: a network controller circuit comprising first and second receiver circuits, wherein the port deselect circuit provides the first words to the first receiver circuit, and wherein the port deselect circuit provides the second words to the second receiver circuit.

In Example 12, the electronic network system of any one of Examples 9-11 may optionally include, wherein the port deselect circuit further comprises a third buffer circuit, wherein the demultiplexer circuit receives third words of third bits that are interleaved with the first and the second words, and wherein the demultiplexer circuit provides each of the third words to the third buffer circuit to regenerate a third packet comprising the third words.

In Example 13, the electronic network system of Example 12 may optionally include, wherein the port deselect circuit further comprises a fourth buffer circuit, wherein the demultiplexer circuit receives fourth words of fourth bits that are interleaved with the first, the second, and the third words, and wherein the demultiplexer circuit provides each of the fourth words to the fourth buffer circuit to regenerate a fourth packet comprising the fourth words.

In Example 14, the electronic network system of any one of Examples 9-13 may optionally further comprise: a port select circuit comprising a first port circuit that stores the first words in the first packet, a second port circuit that stores the second words in the second packet, and a multiplexer circuit that receives the first words from the first port circuit and the second words from the second port circuit, and wherein the multiplexer circuit interleaves the second words with the first words in a first output signal such that the first one of the second words is provided in the first output signal after the first one of the first words in the first packet and before the second one of the first words in the first packet.

In Example 15, the electronic network system of Example 14 may optionally further comprise: a security controller circuit that performs a security function on the first output signal to generate a second output signal indicating the first words and the second words, wherein the second output signal is provided to the port deselect circuit.

Example 16 is a method for transmitting data in an electronic network system, the method comprising: receiving first bits from a first transmitter circuit; receiving second bits from a second transmitter circuit; storing first words of the first bits from a first packet in a first buffer circuit in a port select circuit; storing second words of the second bits from a second packet in a second buffer circuit in the port select circuit; providing the first words from the first buffer circuit and the second words from the second buffer circuit to a multiplexer circuit in the port select circuit; and interleaving the second words with the first words in an output signal using the multiplexer circuit such that a first one of the second words from the second packet is provided in the output signal after a first one of the first words from the first packet and before a second one of the first words from the first packet.

In Example 17, the method of Example 16 may optionally further comprise: receiving third bits from a third transmitter circuit; storing third words of the third bits from a third packet in a third buffer circuit; providing the third words from the third buffer circuit to the multiplexer circuit; and interleaving the first, the second, and the third words in the output signal using the multiplexer circuit such that at least one of the third words is provided in the output signal after the first ones of the first and the second words and before the second one of the first words and a second one of the second words in the second packet.

In Example 18, the method of any one of Examples 16-17 may optionally further comprise: receiving the second words interleaved with the first words in an input signal that is derived from the output signal at a demultiplexer circuit in a port deselect circuit; providing each of the first words to a first port circuit in the port deselect circuit to regenerate the first packet; and providing each of the second words to a second port circuit in the port deselect circuit to regenerate the second packet.

In Example 19, the method of any one of Examples 16-18 may optionally further comprise: accumulating the first bits received from the first transmitter circuit into the first words using a first accumulator circuit in the port select circuit; providing the first words to the first buffer circuit; accumulating the second bits received from the second transmitter circuit into the second words using a second accumulator circuit in the port select circuit; and providing the second words to the second buffer circuit.

In Example 20, the method of any one of Examples 16-19 may optionally further comprise: performing a security function using a security controller circuit on the output signal of the multiplexer circuit to generate an additional output signal indicating the first and the second words.

In Example 21, the method of any one of Examples 16-20 may optionally further comprise: dynamically reconfiguring the first transmitter circuit to change a transmission speed of the first bits from a first bit rate to a second bit rate that is different than the first bit rate; and dynamically reconfiguring the second transmitter circuit to change a transmission speed of the second bits from the first bit rate to the second bit rate, wherein storing the first words in the first buffer circuit comprises storing the first words at each of the first bit rate and the second bit rate in the first buffer circuit, and wherein storing the second words in the second buffer circuit comprises storing the second words at each of the first bit rate and the second bit rate in the second buffer circuit.

The foregoing description of the examples has been presented for the purpose of illustration. The foregoing description is not intended to be exhaustive or to be limiting to the examples disclosed herein. In some instances, various features can be employed without a corresponding use of other features as set forth. Many modifications, substitutions, and variations are possible in light of the above teachings, without departing from the scope of the present embodiments.

What is claimed is:

1. An electronic network system comprising:
   a first transmitter circuit that transmits first bits;
   a second transmitter circuit that transmits second bits; and
   a port select circuit comprising a first buffer circuit that stores first words in a first packet of the first bits received from the first transmitter circuit, a second buffer circuit that stores second words in a second packet of the second bits received from the second transmitter circuit, and a multiplexer circuit that receives the first words from the first buffer circuit and the second words from the second buffer circuit, wherein the multiplexer circuit interleaves the second words with the first words in a first output signal such that a first one of the second words in the second packet is provided in the first output signal after a first one of the first words in the first packet and before a second one of the first words in the first packet.

2. The electronic network system of claim 1 further comprising:
   a third transmitter circuit that transmits third bits, wherein the port select circuit further comprises a third buffer circuit that stores third words in a third packet of the third bits received from the third transmitter circuit, wherein the multiplexer circuit receives the third words from the third buffer circuit, and wherein the multiplexer circuit interleaves the first, the second, and the third words in the first output signal such that a first one of the third words in the third packet is provided in the first output signal after the first ones of the first and the second words and before the second one of the first words and a second one of the second words in the second packet.

3. The electronic network system of claim 2 further comprising:
a fourth transmitter circuit that transmits fourth bits, wherein the port select circuit further comprises a fourth buffer circuit that stores fourth words in a fourth packet of the fourth bits received from the fourth transmitter circuit, wherein the multiplexer circuit receives the fourth words from the fourth buffer circuit, and wherein the multiplexer circuit interleaves the first, the second, the third, and the fourth words in the first output signal in response to a clock signal such that one of the fourth words is provided in the first output signal after the first ones of the first, the second, and the third words and before the second ones of the first and the second words and a second one of the third words in the third packet.

4. The electronic network system of claim 1 further comprising:
a security controller circuit that performs a security function on the first output signal to generate a second output signal indicating the first and the second words; and
a port deselect circuit comprising first and second port circuits and a demultiplexer circuit that receives the second output signal, wherein the demultiplexer circuit provides each of the first words to the first port circuit and each of the second words to the second port circuit.

5. The electronic network system of claim 2 further comprising:
a port deselect circuit comprising a fourth buffer circuit, a fifth buffer circuit, a sixth buffer circuit, and a demultiplexer circuit that receives the first, the second, and the third words, wherein the demultiplexer circuit provides each of the first words to the fourth buffer circuit to regenerate the first packet, each of the second words to the fifth buffer circuit to regenerate the second packet, and each of the third words to the sixth buffer circuit to regenerate the third packet.

6. The electronic network system of claim 3 further comprising:
a port deselect circuit comprising a fifth buffer circuit, a sixth buffer circuit, a seventh buffer circuit, an eighth buffer circuit, and a demultiplexer circuit that receives the first, the second, the third, and the fourth words, wherein the demultiplexer circuit provides each of the first words to the fifth buffer circuit to regenerate the first packet, each of the second words to the sixth buffer circuit to regenerate the second packet, each of the third words to the seventh buffer circuit to regenerate the third packet, and each of the fourth words to the eighth buffer circuit to regenerate the fourth packet.

7. The electronic network system of claim 1, wherein the port select circuit further comprises a first accumulator circuit that accumulates the first bits received from the first transmitter circuit into the first words and that provides the first words to the first buffer circuit, and wherein the port select circuit further comprises a second accumulator circuit that accumulates the second bits received from the second transmitter circuit into the second words and that provides the second words to the second buffer circuit.

8. The electronic network system of claim 1, wherein the first transmitter circuit is dynamically reconfigured to change a transmission speed of the first bits from a first bit rate to a second bit rate that is different than the first bit rate, wherein the second transmitter circuit is dynamically reconfigured to change a transmission speed of the second bits from the first bit rate to the second bit rate, wherein the first buffer circuit stores the first words at each of the first bit rate and the second bit rate, wherein the second buffer circuit stores the second words at each of the first bit rate and the second bit rate, and wherein the multiplexer circuit interleaves the second words with the first words at each of the first bit rate and the second bit rate.

9. An electronic network system comprising:
a port deselect circuit comprising first and second buffer circuits and a demultiplexer circuit that receives first words of first bits from a first packet that are interleaved with second words of second bits from a second packet such that a first one of the second words is received after a first one of the first words in the first packet and before a second one of the first words in the first packet, wherein the demultiplexer circuit provides each of the first words to the first buffer circuit to regenerate the first packet, and wherein the demultiplexer circuit provides each of the second words to the second buffer circuit to regenerate the second packet.

10. The electronic network system of claim 9, wherein the port deselect circuit further comprises first and second downsizer circuits, wherein the first downsizer circuit separates the first bits in each of the first words received from the first buffer circuit to generate first groups of bits, wherein each of the first groups has less bits than each of the first words, wherein the second downsizer circuit separates the second bits in each of the second words received from the second buffer circuit to generate second groups of bits, and wherein each of the second groups has less bits than each of the second words.

11. The electronic network system of claim 9 further comprising:
a network controller circuit comprising first and second receiver circuits, wherein the port deselect circuit provides the first words to the first receiver circuit, and wherein the port deselect circuit provides the second words to the second receiver circuit.

12. The electronic network system of claim 9, wherein the port deselect circuit further comprises a third buffer circuit, wherein the demultiplexer circuit receives third words of third bits that are interleaved with the first and the second words, and wherein the demultiplexer circuit provides each of the third words to the third buffer circuit to regenerate a third packet comprising the third words.

13. The electronic network system of claim 12, wherein the port deselect circuit further comprises a fourth buffer circuit, wherein the demultiplexer circuit receives fourth words of fourth bits that are interleaved with the first, the second, and the third words, and wherein the demultiplexer circuit provides each of the fourth words to the fourth buffer circuit to regenerate a fourth packet comprising the fourth words.

14. The electronic network system of claim 9 further comprising:
a port select circuit comprising a first port circuit that stores the first words in the first packet, a second port circuit that stores the second words in the second packet, and a multiplexer circuit that receives the first words from the first port circuit and the second words from the second port circuit, and wherein the multiplexer circuit interleaves the second words with the first words in a first output signal.

15. The electronic network system of claim 14 further comprising:
a security controller circuit that performs a security function on the first output signal to generate a second output signal indicating the first words and the second words, wherein the second output signal is provided to the port deselect circuit.

16. A method for transmitting data in an electronic network system, the method comprising:
receiving first bits from a first transmitter circuit;
receiving second bits from a second transmitter circuit;
storing first words of the first bits from a first packet in a first buffer circuit in a port select circuit;
storing second words of the second bits from a second packet in a second buffer circuit in the port select circuit;
providing the first words from the first buffer circuit and the second words from the second buffer circuit to a multiplexer circuit in the port select circuit; and
interleaving the second words with the first words in an output signal using the multiplexer circuit such that a first one of the second words from the second packet is provided in the output signal after a first one of the first words from the first packet and before a second one of the first words from the first packet.

17. The method of claim 16 further comprising:
receiving third bits from a third transmitter circuit;
storing third words of the third bits from a third packet in a third buffer circuit;
providing the third words from the third buffer circuit to the multiplexer circuit; and
interleaving the first, the second, and the third words in the output signal using the multiplexer circuit such that at least one of the third words is provided in the output signal after the first ones of the first and the second words and before the second one of the first words and a second one of the second words in the second packet.

18. The method of claim 16 further comprising:
receiving the second words interleaved with the first words in an input signal that is derived from the output signal at a demultiplexer circuit in a port deselect circuit;
providing each of the first words to a first port circuit in the port deselect circuit to regenerate the first packet; and
providing each of the second words to a second port circuit in the port deselect circuit to regenerate the second packet.

19. The method of claim 16 further comprising:
accumulating the first bits received from the first transmitter circuit into the first words using a first accumulator circuit in the port select circuit;
providing the first words to the first buffer circuit;
accumulating the second bits received from the second transmitter circuit into the second words using a second accumulator circuit in the port select circuit; and
providing the second words to the second buffer circuit.

20. The method of claim 16 further comprising:
performing a security function using a security controller circuit on the output signal of the multiplexer circuit to generate an additional output signal indicating the first and the second words.

21. The method of claim 16 further comprising:
dynamically reconfiguring the first transmitter circuit to change a transmission speed of the first bits from a first bit rate to a second bit rate that is different than the first bit rate; and
dynamically reconfiguring the second transmitter circuit to change a transmission speed of the second bits from the first bit rate to the second bit rate,
wherein storing the first words in the first buffer circuit comprises storing the first words at each of the first bit rate and the second bit rate in the first buffer circuit, and wherein storing the second words in the second buffer circuit comprises storing the second words at each of the first bit rate and the second bit rate in the second buffer circuit.

* * * * *